United States Patent Office 2,797,221
Patented June 25, 1957

2,797,221
PROCESS AND INTERMEDIATES FOR PRODUCING 1-BROMOCODEINONE

Marshall D. Gates, Jr., Pittsford, N. Y., assignor to Merck & Co., Inc., Rahway, N. J., a corporation of New Jersey No Drawing. Application June 22, 1954, Serial No. 438,599

15 Claims. (Cl. 260—285)

This invention is concerned with novel phenanthrene compounds and processes of preparing the same; more particularly it relates to processes and novel intermediate compounds useful in the synthesis of codeine.

Codeine, an important analgesic which is widely used in medicine, has heretofore not been prepared by total synthesis. Since codeine can be converted to another important analgesic, morphine, a method is now made available whereby both of these alkaloids, heretofore principally obtained from opium, can be prepared synthetically.

It is an object of my present invention to provide novel processes and new phenanthrene compounds useful in the synthesis of codeine. A further object is to provide processes for the production of codeine, utilizing β-dihydrothebainone, dihydrothebainone, β-thebainone and thebainone as staring materials. Another object is to provide a novel process for the epimerization of β-thebainone compounds to obtain the corresponding isomers of the cis series. It is also an object of my invention to provide a process for preparing 1-bromocodeinone from 1-bromo-thebainone or thebainone. An additional object is to provide a process for converting 1-bromocodeinone to codeine. Other objects will be apparent from the detailed description hereinafter provided.

In accordance with an embodiment of my invention, I have found that codeine can be prepared from β-dihydrothebainone by a process comprising brominating β-dihydrothebainone to obtain the 1,7-dibromo derivative, treating this bromo derivative with a nitrogenous ketone reagent, cleaving the resulting nitrogenous derivative of the bromo compound to obtain 1-bromothebainone, converting the latter compound to dihydrothebainone by reduction, brominating the dihydrothebainone to form the 1,5,7-tribromo derivative, treating this tribromo derivative with a nitrogenous ketone reagent, cleaving the resulting nitrogenous ketone derivative to form 1-bromocodeinone, and reducing this bromo derivative to form codeine.

This general procedure for the preparation of codeine may be specifically illustrated by the following reactions showing a preferred process of preparing codeine using β-dihydrothebainone as the starting material:

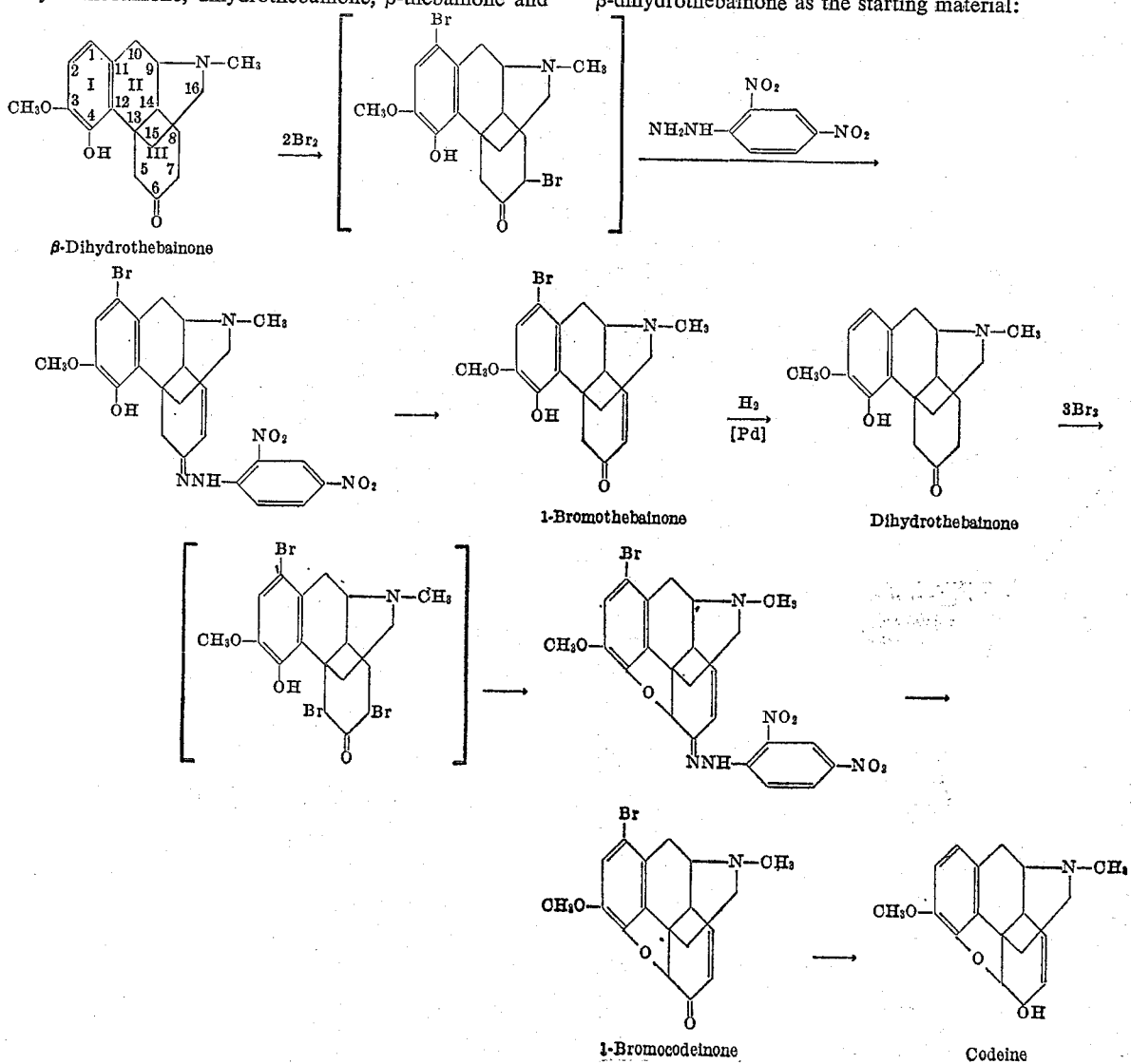

Thus, in accordance with the foregoing reaction scheme, β-dihydrothebainone is brominated to form the 1,7-dibromo derivative which is reacted with 2,4-dinitrophenylhydrazine to form the hydrazone of 1-bromothebainone. This hydrazone is then cleaved with acid to form 1-bromothebainone which on hydrogenation with palladium is reduced to dihydrothebainone. The latter compound is brominated with 3 moles of bromine to form the tribromo derivative which on reaction with 2,4-dinitrophenylhydrazine forms the 1-bromohydrazone. When this hydrazone is cleaved with acid and the resulting 1-bromocodeinone is reduced with lithium aluminum hydride, codeine is obtained.

In accordance with one embodiment of my invention, I have found that compounds of the β-thebainone series wherein the ring fusion of rings 2 and 3 is in the trans position, may be epimerized by reaction in acid with a nitrogenous ketone reagent to form the corresponding ketone derivative. It is indeed remarkable and unexpected that the formation in acid of these ketone derivatives simultaneously results in the epimerization of the compound at $C_{14}$ to form the corresponding cis compound. Thus, as indicated above, this remarkable reaction may be utilized in the process of preparing 1-bromothebainone from β-dihydrothebainone as shown in the foregoing flow sheet. In carrying out this epimerization process I have found that it is particularly advantageous to employ 2,4-dinitrophenylhydrazine as the nitrogenous ketone reagent, although other reagents such as semicarbazide and phenylhydrazine may be similarly employed in this reaction. The ketone derivatives are readily cleaved by treating said derivatives with an acid to regenerate the ketone. Thus the dinitrophenyl hydrazones are readily cleaved by heating the compounds with hydrochloric acid in an acetone medium, or with pyruvic acid.

Alternatively, as will be readily apparent to those skilled in the art, 1-bromothebainone can also be prepared by first forming the nitrogenous ketone derivative and effecting the epimerization and then treating this derivative with bromine to form the 1-bromothebainone derivative. When this derivative is then cleaved by reaction with acid, the desired 1-bromothebainone is obtained. Similarly, 1-bromothebainone can be prepared from thebainone by forming a nitrogenous ketone derivative, and then brominating the resulting derivative. Thus, when 2,4-dinitrophenylhydrazine is employed as the nitrogenous ketone reagent, the β-thebainone or thebainone is treated with this reagent in an acetic acid medium to form the dinitrophenylhydrazone of thebainone. This hydrazone can the be brominated to form the 1-bromo derivative of the thebainone dinitrophenylhydrazone which on cleavage with acid yields 1-bromothebainone.

In effecting the epimerization of the β-thebainone compounds, it is necessary that the nitrogenous ketone derivatives of the β-thebainone compound be intimately contacted in solution with acid, preferably by heating the nitrogenous ketone derivative in the presence of an acid, such as acetic acid. Thus, the epimerization of the β-thebainone compound is readily effected by preparing the nitrogenous ketone derivative in the presence of acid. For example, by heating together β-thebainone, 2,4-dinitrophenylhydrazine and acetic acid, the 2,4-dinitrophenylhydrazone of thebainone is formed and can be recovered from the resulting reaction mixture. Alternatively, the nitrogenous ketone derivative of the β-thebainone compound can be first prepared and then converted to the corresponding thebainone derivative by reaction in solution with an acid. For example, when β-thebainone perchlorate is reacted with 2,4-dinitrophenylhydrazine and acetic acid, the 2,4-dinitrophenylhydrazone derivative of β-thebainone perchlorate which is formed immediately precipitates from solution and is recovered in solid form. Upon the addition of bromine to this 2,4-dinitrophenylhydrazone of β-thebainone perchlorate, 1-bromo-β-thebainone-2,4-dinitrophenylhydrazone is produced which on heating with acetic acid is epimerized to form 1-bromothebainone-2,4-dinitrophenylhydrazone.

Pursuant to a further embodiment of my invention, I have found that 1-bromothebainone may be reduced with hydrogen in the presence of a palladium catalyst to obtain dihydrothebainone. This hydrogenation is conveniently carried out in the presence of a suitable non-reactive solvent such as ethyl alcohol.

In accordance with another embodiment of my invention, dihydrothebainone is converted to 1-bromocodeinone by the process comprising brominating dihydrothebainone to form the 1,5,7-tribromo derivative, reacting this bromine compound with a nitrogenous ketone reagent, such as hydrazine, to form the nitrogenous ketone derivative of 1-bromocodeinone and cleaving this derivative to form 1-bromocodeinone. In carrying out this reaction I find it most convenient to utilize 2,4-dinitrophenylhydrazine as the nitrogenous ketone reagent, although other hydrazines such as semicarbazide or phenylhydrazine may also be employed.

Pursuant to a further embodiment of my invention, I have found that 1-bromocodeinone can be readily converted to codeine by reduction with lithium aluminum hydride. This reaction is readily effected by heating 1-bromocodeinone with lithium aluminum hydride in a suitable non-reactive solvent such as tetrahydrofuran. After the reaction is complete, the codeine may be conveniently recovered by destroying excess lithium aluminum hydride with ethyl acetate, acidifying the resulting solution, extracting said solution with a suitable solvent such as ether to remove impurities, making the resulting acid layer alkaline and extracting the codeine from the alkaline solution with chloroform.

In accordance with an added embodiment of my invention, I have found that when β-dihydrothebainone is reacted with bromine to form the bromine derivatives, and the resulting bromine derivatives are reacted with a nitrogenous ketone reagent, there is also formed in this reaction the nitrogenous ketone derivative of codeine. Thus, in this process it is likely that the bromine reacts with the β-dihydrothebainone to form the 5,7-dibromo derivative which on reaction with a nitrogenous ketone reagent such as 2,4-dinitrophenylhydrazine, is converted to the nitrogenous ketone derivative of codeinone. This method of preparing the derivative of codeinone directly may be represented as follows:

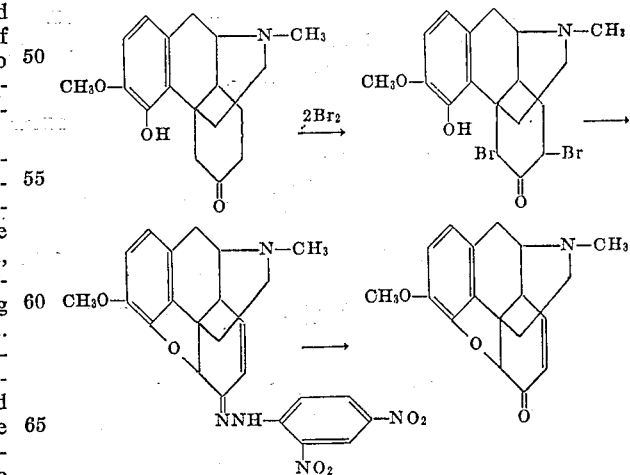

This reaction is of economic importance since it avoids a number of the steps which would otherwise be required to obtain codeinone from β-dihydrothebainone.

The β-dihydrothebainone utilized as the starting material in the preparation of codeine described above may be prepared as disclosed in my copending application Serial No. 272,247, filed February 18, 1952 now Patent Number 2,732,375. This application is a continuation-in-part of my copending application Serial No. 272,248, filed February 18, 1952 now abandoned.

The following examples are presented as illustrative embodiments of my invention.

EXAMPLE 1

Preparation of 1-bromothebainone

β-Dihydrothebainone (602 mg., 2 ml.) from its perchlorate was dissolved in 20 cc. of chloroform and treated dropwise with 4 cc. (4 moles) of a solution of 1.60 g. of bromine in 10 cc. of glacial acetic acid. Decolorization was rapid, and after five minutes the mixture was treated with 440 mg. of 2,4-dinitrophenylhydrazone and 10 cc. of glacial acetic acid and heated on the steam bath for 45 minutes.

The reaction mixture was cooled, diluted with water, made basic with ammonia, and extracted four times with chloroform. The chloroform extracts were washed twice with dilute ammonia, then with water, then dried, filtered, and chromatographed on alumina using alcohol-free chloroform as a developing solvent. A broad brown band passed through the column as the least strongly adsorbed fraction to give a bright orange eluate which on concentration yielded a total of 702 mg. of residue, which crystallized readily on scratching under ethyl acetate, M. P. 145–170° C. Recrystallization from ethyl acetate gave 212 mg. of light orange prisms or plates, M. P. 199–202° C. dec. Additional material could be obtained from the filtrates, which also in a number of runs yielded a very small amount of codeinone dinitrophenylhydrazone, M. P. 261–264° C., dec. Recrystallization of the 1-bromothebainone dinitrophenylhydrazone raised the M. P. to 204–206° C., dec. $[\alpha]_D^{27}$—1307°, λ max. 379 mμ log 4.49. Its mixed M. P. with the bromination product of thebainone dinitrophenylhydrazone or with the dinitrophenylhydrazone of 1-bromothebainone was undepressed.

This material (565 mg.) was dissolved in 30 cc. of acetone and 4 cc. of 5N hydrochloric acid and refluxed for twenty hours. Most of the acetone was then removed by blowing, and the residue, diluted with water, was extracted four times with chloroform. (The hydrochlorides of the dinitrophenylhydrazones of this series readily pass into chloroform from dilute acid solutions.) The nearly colorless aqueous raffinate was made basic with ammonia and extracted three times with chloroform. The washed, dried, filtered, and concentrated chloroform extracts yielded 266 mg. of light tan residue which crystallized readily on scratching, M. P. 183–189° C., dec. Recrystallization from ethyl acetate with the aid of activated charcoal gave 173 mg. of 1-bromothebainone, M. P. 196–197.5° C., dec., colorless needles or prisms, whose M. P. was not depressed by admixture with 1-bromothebainone prepared by direct bromination of thebainone (purified through its hydriodide) in acetic acid.

EXAMPLE 2

Preparation of dihydrothebainone

1-Bromothebainone, 96 mg., M. P. 198.5–199.5° C. was hydrogenated in alcohol over palladium on barium carbonate (5%, 200 mg.). Approximately 2 moles (11 cc.) were absorbed during thirty minutes, and then no more was absorbed during the next five hours. The catalyst was removed by filtration and after the solution was concentrated by blowing, the residue was diluted with water, made basic with ammonia, and extracted four times with chloroform. The washed, dried, filtered, and concentrated chloroform solution yielded 74 mg. of dihydrothebainone hydrate as a colorless glass which solidified readily, M. P. 123–136° C. Identification of dihydrothebainone hydrate by M. P. is unsatisfactory since even samples, which have been carefully purified through the sparingly soluble hydriodide, melt over a wide range (123–152° C.) so the material was characterized as its hydriodide, M. P. 277–278.5° C., its oxime hydrochloride, M. P. 300° C., and its oxime, M. P. 252–253.5° C. Mixed melting points of the hydriodide and oxime did not depress those of authentic samples. The base, recovered from its hydriodide, had M. P. 123–152° C. as did an authentic sample.

EXAMPLE 3

Preparation of 1-bromocodeinone

A solution of dihydrothebainone hydrate, M. P. 130–153° C., 602 mg. (2 moles) in 10 cc. of glacial acetic acid was treated with 6 cc. (6 moles) of a solution of 1.60 g. of bromine in 10 cc. of acetic acid and carefully warmed, eventually nearly to boiling, to effect decolorization of the bromine. Four hundred mg. of 2,4-dinitrophenylhydrazone was then added, and the solution was refluxed for five minutes. After cooling and diluting with water, the solution was made basic with ammonia and extracted with chloroform four times. The chloroform extracts were washed with 10% sodium hydroxide solution three times (the first two alkali extracts were very dark), then with water, dried, filtered, and concentrated to leave 1.30 g. of brown-black glass. This material was chromatographed twice on alumina in 20% benzene in chloroform to give 872 mg. of orange-red glass. In each case a diffuse brown column remained after the passage of the green-brown dinitrophenylhydrazone layer into the filtrate.

The residue (872 mg.) was taken into ethyl acetate and a little chloroform, concentrated and set aside to yield 375 mg. of orange, poorly crystalline solid, M. P. 190–202° C. This material is contaminated with a stubborn impurity which is only slowly removed by crystallization, but by a number of crystallizations pure 1-bromocodeinone dinitrophenylhydrazone, M. P. 224–225° C., $[\alpha]_D^{27}$—1940°, λmax. 377 mμ., log e 4.51, can be obtained. It does not depress the M. P. of the dinitrophenylhydrazone, M. P. 224–224.5° C., prepared directly from 1-bromocodeinone.

Cleavage of this dinitrophenylhydrazone is rendered difficult because of the pronounced instability towards acid of 1-bromocodeinone. It is necessary to stop the cleavage before completion to isolate appreciable amounts of 1-bromocodeinone. Two hundred and twenty mg. of the above dinitrophenylhydrazone in 4 cc. of distilled pyruvic acid, N. E. 91, and 0.8 cc. water were heated at 65° C. for four hours and thirty minutes. The mixture was diluted with water, acidified with 5N hydrochloric acid (3 cc.) and extracted four times with chloroform (1-bromocodeinonedinitrophenylhydrazone hydrochloride passes into the chloroform layers). The nearly colorless raffinate was made basic with 10% sodium hydroxide after ice cooling, and the basic solution was extracted with peroxide free ether four times. The washed, dried and filtered ether solution was concentrated to yield 35 mg. of pale yellow glass which solidified spontaneously under ethyl acetate, M. P. 192–196° C., dec. Several crystallizations of the 1-bromocodeinone raised the M. P. to 201–202° C., dec. The M. P. was not depressed by admixture with 1-bromocodeinone prepared by Oppenauer oxidation of 1-bromocodeine.

From the original chloroform extracts by appropriate treatment 98 mg. of recovered starting material, M. P. 220–223° C. dec., as well as 34 mg. of pyruvic acid dinitrophenylhydrazone, M. P. 208.5–211° C., can be obtained.

EXAMPLE 4

Preparation of codeine

A mixture of 200 mg. of 1-bromocodeinone, M. P. 202.5–203.5° C., 0.5 g. of lithium aluminum hydride and 30 cc. of carefully purified tetrahydrofuran was refluxed for forty-six hours. After destruction of the excess reagent with ethyl acetate, the mixture was acidified with 2N hydrochloric acid and extracted with ether. The acid layer was added slowly to a strong potassium hydroxide solution containing Rochelle salt. The resulting alkaline suspension was extracted three times with chloroform, and the chloroform layers were washed, dried, filtered, and concentrated to give 146 mg. (159 theo.) of colorless glass, which was converted to its hydrobromide, 131 mg., M. P. 148–160° C., resolidifying, remelting > 270° C. Recrystallization of this hydrobromide gave 110 mg., properties essentially unchanged.

This hydrobromide, dissolved in warm water, on treatment with ammonia gave an oil which rapidly crystallized, 70 mg., M. P. 153–156° C. Recrystallization from dilute methanol gave 59 mg., M. P. 156.5–158° C., large prisms, hydrated. Its M. P. was undepressed on admixture with authentic codeine, M. P. 157–158.4° C. crystallized as above, but was strongly depressed by admixture of 1-bromocodeine of M. P. 161–163° C.

EXAMPLE 5

*Preparation of β-thebainone-2,4-dinitrophenylhydrazone*

β-Thebainone perchlorate (435 mg.), melting point 150–155° C., was dissolved in 3 cc. of glacial acetic acid and treated with 210 mg. of 2,4-dinitrophenylhydrazine. On warming on the steam bath, the dinitrophenylhydrazine went into solution and within a few minutes a copious crystalline precipitate of β-thebainone-2,4-dinitrophenylhydrazone perchlorate separated. Heating was continued for twenty minutes and then the mixture was cooled and the precipitate collected and washed with acetic acid, to recover 514 mg. (89%). The free base was recovered from this perchlorate by suspension in dilute ammonia and extraction with chloroform. The washed, dried, filtered and concentrated chloroform extracts yielded 431 mg. of orange-red glass which crystallized on scratching under ethyl acetate-alcohol, melting point 207–211° C. Several crystallizations from ethyl alcohol gave 304 mg., melting point 224–225° C. $[\alpha]_D^{20}+13.5°$.

Calc. for $C_{24}H_{25}N_5O_6$: C. 60.12; H. 5.26. Found: C. 60.08; H. 5.14.

EXAMPLE 6

*Bromination of β-thebainone-2,4-dinitrophenylhydrazone*

The above material from Example 5 (63 mg.) in 1 cc. of glacial acetic acid was treated with 1.32 cc. of a solution of 1.60 g. of bromine in 100 cc. of acetic acid. A transient perbromide precipitated but rapidly redissolved. After standing five minutes, the mixture was diluted with water and made basic with ammonia. The bright orange precipitate, 74 mg. (theo. 74), melting point 145–155° C., amorphous, was crystallized from ethyl acetate-alcohol several times to give 40 mg. deep ruby red prisms, melting point 157–165° C. with foaming and loss of solvent, $[\alpha]_D^{27}=76.4°$.

Calc. for $C_{24}H_{24}N_5O_6Br \cdot C_2H_5OH$: C, 51.66; H, 5.00; loss in weight on drying 7.63. Found: C, 52.47; H, 5.22; loss in weight on drying 7.89.

EXAMPLE 7

*Isomerization of 1-bromo-β-thebainone-2,4-dinitrophenylhydrazone*

Thirty-four mg. of 1-bromo-β-thebainone-2,4-dinitrophenylhydrazone, M. P. 157–165° C. foaming, was heated on the steam bath in 1 cc. of glacial acetic acid for two and one-half hours. The mixture was cooled, diluted with water, made basic with ammonia and extracted three times with ether. The washed, dried, filtered and concentrated chloroform solution yielded 32 mg. of orange glass which crystallized readily on scratching under ethyl acetate, M. P. 175–187° C. A number of crystallizations gave 6 mg. of light orange plates or prisms, M. P. 206–207° C. whose M. P. with the 2,4-dinitrophenylhydrazone of 1-bromothebainone of M. P. 203–204.5° C., $[\alpha]_D^{27}-1307°$, was undepressed.

EXAMPLE 8

*The action of 2,4-dinitrophenylhydrazine on β-thebainone in acetic acid*

In contrast to the run described above in Example 5 using β-thebainone perchlorate, in which the dinitrophenylhydrazone perchlorate separates almost at once, the free base gives an entirely different product: β-thebainone base (299 mg.) and 220 mg. of 2,4-dinitrophenylhydrazine in 2 cc. of glacial acetic acid were heated for two and one-half hours on the steam bath. The mixture was cooled, diluted with water, made basic with ammonia and extracted three times with chloroform. The washed and dried chloroform extracts were chromatographed on alumina, developing with alcohol-free chloroform. A well-defined orange-brown band passed into the filtrate, and yielded on concentration 342 mg. of orange glass which solidified on scratching under ethyl acetate, M. P. about 75° C. with much foaming. After several crystallizations, from ethyl acetate-alcohol, the material melted from 140–150° C. with foaming and gas evolution, partially resolidified, then remelted at about 206° C. $[\alpha]_D^{27}=1281°$.

Calc. for $C_{24}H_{25}N_5O_6$: C. 60.12; H, 5.26. Found: C, 59.78; H, 5.32.

The material is definitely a solvate and no real assurance of its homogeneity has been obtained. It is believed that it is largely thebainone, not β-thebainone, 2,4-dinitrophenylhydrazone. (See Example 10.)

EXAMPLE 9

*Bromination of the product of the action of 2,4-dinitrophenyl-hydrazine on β-thebainone base*

The product obtained in Example 8 (56 mg.) in 1 cc. of glacial acetic acid was treated with 1.17 cc. of a solution of 1.60 g. of bromine in 100 cc. of acetic acid. A yellow perbromide separated but rapidly redissolved. After standing for ten minutes, the mixture was diluted with water and made basic with ammonia. The light orange precipitate was collected and washed with water, 61 mg., M. P. 135–150° C. amorphous. Crystallized from ethyl acetate, 52 mg., M. P. 201–204° C. One further recrystallization gave 47 mg. of the 2,4-dinitrophenylhydrazone of 1-bromothebainone, M. P. 203.5–204.5° C., not depressed by admixture with the 2,4-dinitrophenylhydrazone of 1-bromothebainone.

EXAMPLE 10

*Preparation of thebainone-2,4-dinitrophenylhydrazone*

Normal thebainone, ½ hydrate (from its hydriodide), (308 mg.) and 220 mg. of 2,4-dinitrophenylhydrazine was warmed on the steam bath in 2 cc. of glacial acetic acid for fifty minutes. The mixture was cooled, diluted with water, made basic with ammonia and extracted three times with chloroform. The washed and dried chloroform extracts were chromatographed on alumina, using alcohol-free chloroform as the developing solvent. A brown-orange band passed into the filtrate and yielded after concentration 462 mg. of material which readily solidified, M. P. 142–145° C. with foaming. After several crystallizations from ethyl acetate-alcohol, 132 mg., M. P. 120–145° C., foaming and loss of solvent, partial resolidification and remelting at 195–206° C. $[\alpha]_D^{27}=-1370°$.

Calc. for $C_{24}H_{25}N_5O_6$: C, 60.12; H, 5.26. Found: C, 60.75; H, 5.41.

This material is a solvent, and may be identical with the dinitrophenylhydrazone obtained from β-thebainone base. (See Example 8.)

EXAMPLE 11

*Bromination of thebainone-2,4-dinitrophenylhydrazone*

Normal thebainone ½ hydrate (103 mg.) was converted to its dinitrophenylhydrazine as described in the foregoing example, except that the reaction mixture, after cooling, was treated with 100 mg. of anhydrous sodium acetate and then with 3.33 cc. of a solution of 1.60 g. of bromine in 100 cc. of glacial acetic acid. The brominated mixture was worked up as in the previous examples and yielded after crystallization 115 mg. of 1-bromothebainone-2,4-dinitrophenylhydrazone in the form of orange leafs or prisms, M. P. 202–204.5° C., which after a further crystallization had M. P. 207–208° C. and did not depress the M. P. of another sample of 1-bromothebainone-2,4-dinitrophenylhydrazone.

EXAMPLE 12

*Preparation of codeinone*

Codeinone 2,4-dinitrophenylhydrazone (200 mg. M. P. 261–264° C.), and 4 cc. of distilled pyruvic acid, N. E. 106.4, were heated in a nitrogen atmosphere for three hours at 65° C. The cooled reaction mixture was poured into water, acidified with 5 cc. of 1 normal hydrochloric acid, and extracted four times with chloroform. The very pale yellow raffinate was made basic with 10% sodium hydroxide and the alkaline suspension was extracted three times with peroxide free ether. The washed, dried, and concentrated ethereal solution yielded 31 mg. of nearly colorless residue which readily solidified on scratching, M. P. 165–177° C., dec. After several crystallizations from ethyl acetate, it melted at 181–183° C., dec. and did not depress the M. P. of authentic codeinone.

The original chloroform extracts yielded on appropriate treatment, 138 mg. of recovered codeinone 2,4-dinitrophenylhydrazone, M. P. 247–251° C., dec.

Various changes and modifications in the foregoing procedures will occur to those versed in the art, and to the extent that such changes and modifications are within the purview of the appended claims, it is to be understood that they constitute part of my invention.

I claim:

1. The process which comprises reacting the 1,5,7-tribromo derivative of dihydrothebainone with a hydrazone in the presence of a lower aliphatic carboxylic acid to form the corresponding hydrazone derivative of 1-bromocodeinone, and cleaving said hydrazone by reaction with an acid from the group consisting of mineral acids and pyruvic acid to produce 1-bromocodeinone.

2. The process which comprises reacting the 1,5,7-tribromo derivative of dihydrothebainone with 2,4-dinitrophenylhydrazone in the presence of acetic acid to form the 2,4-dinitrophenylhydrazone of 1-bromocodeinone, and cleaving said dinitrophenylhydrazone by reaction with pyruvic acid to produce 1-bromocodeinone.

3. The process which comprises reacting β-thebainone perchlorate with 2,4-dinitrophenylhydrazine in the presence of acetic acid to form β-thebainone 2,4-dinitrophenylhydrazone perchlorate, intimately contacting this compound with bromine to form the corresponding 1-bromo derivative and heating this compound with acetic acid to produce 1-bromothebainone 2,4-dinitrophenylhydrazone.

4. The process which comprises reacting β-dihydrothebainone perchlorate with a hydrazine in the presence of a lower aliphatic carboxylic acid to form the corresponding hydrazone of β-dihydrothebainone perchlorate, intimately contacting this compound with bromine to produce the corresponding 1-bromo derivative, and heating the latter compound with acid to produce the corresponding hydrazone derivative of 1-bromothebainone.

5. The process which comprises reacting β-thebainone with 2,4-dinitrophenyl hydrazine in the presence of acetic acid to form thebainone 2,4-dinitrophenylhydrazone, and intimately contacting this compound with bromine to form the 2,4-dinitrophenylhydrazone of 1-bromothebainone.

6. The process which comprises reacting β-thebainone with a hydrazine in the presence of a lower aliphatic carboxylic acid to form the corresponding hydrazone derivative of thebainone, and reacting the latter compound with bromine to produce the corresponding hydrazone of 1-bromothebainone.

7. The process which comprises reacting the thebainone with 2,4-dinitrophenylhydrazine in the presence of acetic acid to produce the 2,4-dinitrophenylhydrazone of thebainone, and intimately contacting this compound with bromine to produce the 2,4-dinitrophenylhydrazone of 1-bromothebainone.

8. The 2,4-dinitrophenylhydrazone of thebainone.

9. The 2,4-dinitrophenylhydrazone of 1-bromocodeinone.

10. The process for effecting the epimerization of a β-thebainone compound which comprises reacting said β-thebainone compound with a hydrazine in the presence of a lower aliphatic carboxylic acid to form the hydrazone of the corresponding thebainone compound.

11. The process for effecting the epimerization of a β-thebainone compound which comprises reacting said compound with 2,4-dinitrophenylhydrazine in the presence of acetic acid to form the 2,4-dinitrophenylhydrazone of the corresponding thebainone compound.

12. The process which comprises reacting 1,7-dibromo-β-dihydrothebainone with a hydrazine in the presence of a lower alihpatic carboxylic acid to form the corresponding hydrazone of 1-bromothebainone.

13. The process which comprises reacting 1,7-dibromo-β-dihydrothebainone with 2,4-dinitrophenylhydrazine in the presence of acetic acid to form the 2,4-dinitrophenylhydrazone of 1-bromothebainone.

14. The process for effecting the epimerization of a hydrazone derivative of a β-thebainone compound which comprises heating said hydrazone derivative in the presence of a lower aliphatic carboxylic acid to form the hydrazone of the corresponding thebainone compound.

15. The process for effecting the epimerization of a 2,4-dinitrophenylhydrazone derivative of a β-thebainone compound which comprises heating said β-thebainone compound in the presence of a lower aliphatic carboxylic acid to form the 2,4-dinitrophenyl hydrazone of the corresponding thebainone compound.

References Cited in the file of this patent

Goto et al.: Ann., vol. 511, pp. 202–9 (1934).

Small: Chemistry of the Opium Alkaloids (1934), page 363.

The Alkaloids, Manske et al., vol. II, Academic Press Inc., publ. New York, N. Y., 1952.